(12) United States Patent
Vasudevan et al.

(10) Patent No.: US 8,126,908 B2
(45) Date of Patent: Feb. 28, 2012

(54) CREATION AND ENRICHMENT OF SEARCH BASED TAXONOMY FOR FINDING INFORMATION FROM SEMISTRUCTURED DATA

(75) Inventors: Sudharsan Vasudevan, Tamil Nadu (IN); Rohan Monga, Punjab (IN); Hemanth Sambrani, Karnataka (IN); N S Sekar, Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 806 days.

(21) Appl. No.: 12/141,833

(22) Filed: Jun. 18, 2008

(65) Prior Publication Data

US 2009/0282010 A1 Nov. 12, 2009

(51) Int. Cl.
*G06F 7/00* (2006.01)
*G06F 17/30* (2006.01)
(52) U.S. Cl. ........................................ 707/769; 707/777
(58) Field of Classification Search .................. 707/737, 707/769, 777
See application file for complete search history.

(56) References Cited

U.S. PATENT DOCUMENTS

| | | | | |
|---|---|---|---|---|
| 2003/0120653 | A1* | 6/2003 | Brady et al. | 707/7 |
| 2005/0065773 | A1* | 3/2005 | Huang et al. | 704/7 |
| 2006/0122994 | A1* | 6/2006 | Kapur et al. | 707/4 |
| 2007/0088532 | A1* | 4/2007 | Alvarez et al. | 703/2 |
| 2007/0214099 | A1* | 9/2007 | Marfatia et al. | 706/20 |
| 2009/0089261 | A1* | 4/2009 | Leher et al. | 707/3 |
| 2009/0193047 | A1* | 7/2009 | Chen et al. | 707/102 |

* cited by examiner

*Primary Examiner* — Apu Mofiz
*Assistant Examiner* — Mohammad Rahman
(74) *Attorney, Agent, or Firm* — Hickman Palermo Truong & Becker LLP

(57) ABSTRACT

Techniques are provided for creating and updating a entity hierarchy (taxonomy) based on information captured about user interaction with a system. Techniques are also provided for using the taxonomy to determine the nature of entities represented by terms submitted to a search engine. Search logs analyzed for related sets of entities, and used to improve the taxonomy for storing information. Once the taxonomy is created, information across data sources are fetched and aggregated based on the taxonomy. When the system is queried, the query is modified to a predefined template, and the best fit result is promptly returned. A feedback mechanism is also provided to enhance taxonomy and entity data based on search volumes. This system enables search engines to provide accurate answers when entities, their attributes and relationships are involved.

10 Claims, 2 Drawing Sheets

CREATION AND ENRICHMENT OF SEARCH BASED TAXONOMY FOR FINDING INFORMATION FROM SEMISTRUCTURED DATA

CROSS-REFERENCE TO RELATED APPLICATION

This application is related to and claims the benefit of priority from Indian Patent Application No. 1133/CHE/2008 filed in India on May 7, 2008, entitled "Creation And Enrichment Of Search Based Taxonomy For Finding Information From Semistructured Data"; the entire content of which is incorporated by this reference for all purposes as if fully disclosed herein.

FIELD OF THE INVENTION

The present invention relates to query processing and, more specifically, to generating search results based on a feedback-driven taxonomy.

BACKGROUND

Search engines seldom give the right answer when entities or attributes or relationships are involved. For example, consider the search query: "family of Marilyn Monroe". Using existing search techniques, this query will probably find documents that contain the term "family" and the name "Marilyn Monroe", but few if any of those are likely to actually be about the family of Marilyn Monroe.

In the above example, the search results do not match the intent of the query submitter because current search technologies do not understand the semantics or the grammar of the query. As another example, consider the query: "When was Ingrid Bergman born?" This query inherently begs for a chronological event while "Where was Ingrid Bergman born?" should result in a geographical location.

Currently, semi-structured information is available throughout the web. For example, "Quotes of Johnny Depp" is available in Imdb.com, while his "family" (son, daughter, and spouse) information is available in movies.yahoo.com. However, this information is unlikely to show up in the search results page of searches for "Quotes of Johnny Depp" and "family of Johnny Depp". Typically, a user would be required to follow one or more links from the search results page to actually obtain such information.

Current search technologies identify buzz words for which search volume is high and give better results for the same. The search technologies do not inherently understand the nature of the entities against which searches are made. Therefore, rather than contain data that answers search queries, search results typically contain links to documents that might contain the answers to search queries. For example, rather than listing the family members of Johnny Depp, search results for "family of Johnny Depp" will typically contain links to documents that might mention the family of Johnny Depp. To obtain the answers in which they are interested, users have to follow the links provided in the search results, and search for the answers in the documents to which those links lead.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
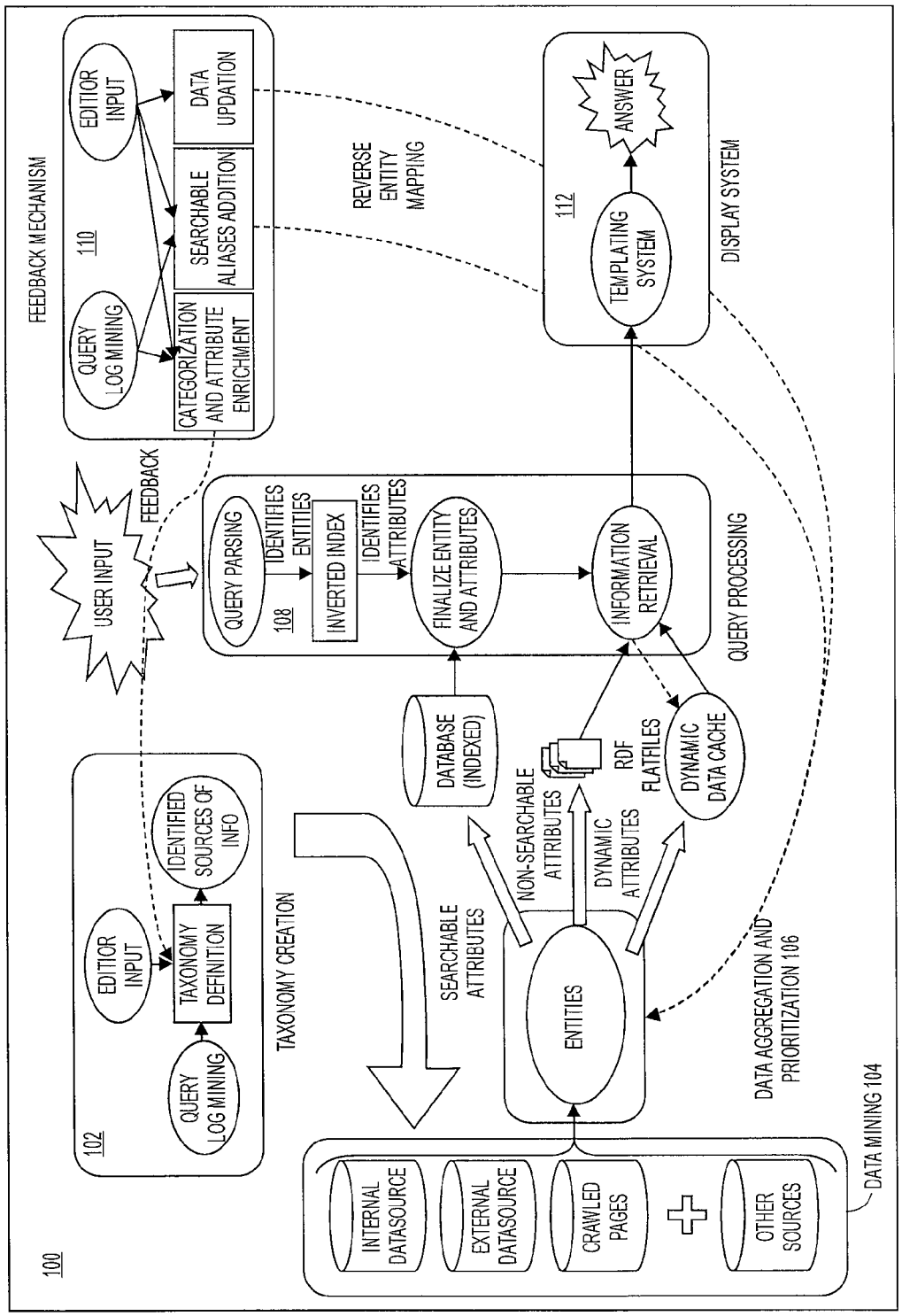
FIG. 1 is a block diagram of a system for creating and updating a taxonomy for use in providing search results that contain data that answers search queries.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are provided for creating and updating a concept hierarchy (taxonomy) based on information captured about user interaction with a system. Specifically, a taxonomy is established in which non-leaf nodes correspond to categories, and leaf nodes correspond to entities that belong to the categories represented by the non-leaf nodes from which they descend. For example, within the taxonomy, the category "movie stars" could descend from the category "person". Various leaf nodes may descend from the "movie stars" category, where each leaf node corresponds to an individual movie star.

The taxonomy also specifies attributes that are associated with categories. Entities that descend from a category "inherit" the attributes associated with the category, and have their own values for those attributes. Thus, the "person" category may have an attribute "date of birth" that applies to all entities that are below the "person" category. The "movie star" category, which is below the "person category", may be associated with additional attributes that specifically apply to members of the "movie stars" category, such as "movies acted". Each move star entity, in turn, may have its own values for the "date of birth" attribute (inherited from the "persons" category) and the "movies acted" attribute (inherited from the "movie stars" category).

Within the taxonomy, nodes may descend from multiple parent nodes that are not directly related to each other. For example, the "Ronald Reagan" entity may descend from both the "movie stars" category and the "politicians" category. As a descendant of both the "movie stars" and "politicians" category, the entity "Ronald Reagan" may have both "movies acted" and "offices held" attributes.

Techniques are also provided for using the taxonomy to determine the nature of entities represented by terms submitted to a search engine. Based on an understanding the nature of the entity involved in a search, the search engine is better able to identify related information which can be incorporated directly into the search results to increase user engagement.

In one embodiment, search logs are aggregated for related sets of entities, and used to improve the taxonomy for storing information. Thus, the taxonomy is created based on feedback from both search logs and also from manual intervention, making that taxonomy more efficient and targeted for search. Once the taxonomy is created, information across data sources are fetched and aggregated based on the taxonomy. While merging the information across data sources, certain common attributes available are checked.

When the system is queried, the query is modified to a predefined template, and the best fit result is promptly returned. The templates may include, for example, (1) Entity is given and value of an attribute is queried for, (2) Value of attribute is given and all entities that match the condition are asked for, (3) Two entities are given and their relationship is being queried for, and (4) Entity and relationship is given and all other entities that fall under that relation are being queried for. These templates, and how they may be used, shall be described in greater detail hereafter.

A feedback mechanism is also provided to enhance taxonomy and entity data based on search volumes. This system enables search engines to provide accurate answers when entities, their attributes and relationships are involved, and to ensure that those answers stay up-to-date with current news and trends.

System Overview

Referring to FIG. 1, it is a block diagram that illustrates a system 100 according to an embodiment of the invention. System 100 includes various subsystems, including a taxonomy creation subsystem 102, a data mining subsystem 104, a data aggregation and prioritization subsystem 106, a query processing subsystem 108, a feedback mechanism 110, and a display subsystem 112.

Taxonomy creation subsystem 102 generally represents the components involved in initially creating a taxonomy. As mentioned above, the non-leaf nodes in the taxonomy correspond to "categories", and the leaf nodes correspond to entities. Links between the nodes indicate relationships between the categories and entities. For example, one category in the taxonomy may represent the category "vehicles". The vehicle category may have several children categories, which nay include: automobiles, bicycles, etc.

According to one embodiment, the taxonomy includes categories that correspond to many different levels of granularity. For example, the categories may range from coarse granularity "humans" to fine granularity "$11^{th}$ Grade Teachers". The leaf nodes, which correspond to individual things, such as individual people, are referred to herein as "entities". Thus, "Johnny Depp" and "Empire State Building" are both entities.

Once initially created, the taxonomy is enhanced and revised based on feedback from feedback mechanism 110, as shall be described in greater detail hereafter. In one embodiment, attributes are classified into one of three classes: searchable attributes, non-searchable attributes, and dynamic attributes. The classification of attributes may be performed manually, by editors, or may be learned based on usage information.

One result of taxonomy creation is the making of a template. This template describes that for a given category C, a list L of attributes is of interest. This template is used by the data mining subsystem 104, and is applied across the "sources of truth" from which values of the attributes for various entities are acquired. Specifically, data mining subsystem 104 gathers information relating to the attributes of the categories represented in the taxonomy. How data aggregation and prioritization subsystem 106 classifies attributes affects how the data from the attributes are gathered processed. For example, in one embodiment, data associated with searchable attributes are stored in an indexed database, data for non-searchable attributes is stored in flat files, and data for dynamic attributes is collected dynamically, either periodically or at the time a search query for the data is being processed.

Query processing subsystem 108 receives queries from users, and answers the queries based, at least in part, on the attribute data stored by the data aggregation and prioritization subsystem 106. Specifically, as shall be described in greater detail hereafter, the query processing subsystem 106 tries to first find out what the user is looking for (When→time, Where→place, Who→person, What→description, How→process, etc.) Then, query processing subsystem 108 classifies the query into a template, such as "e→A" (entity given, attribute queried). From the name of attribute, query processing subsystem 108 finds out which category "e" belongs to. (ref. humans have children, cars have engines etc.). Values may then be retrieved for the appropriate attributes of the identified entity.

In one embodiment, query processing subsystem 108 includes the attribute data in the search results page itself, which is provided to display subsystem 112. Thus, when the search results are displayed to a user by display subsystem 112, the user is able to see data that answers the search query within the search page itself. For example, the search result page for "family of Johnny Depp" would include the names of members of Johnny Depp's family, rather than simply containing links to other services that may be able to provide the desired information.

Feedback mechanism 110 reads data about how users are actually interacting with the search system. For example, feedback mechanism 110 may read the query logs to identify terms that are frequently used together in search queries. Based on this actual usage information, the feedback mechanism 110 may identify new categories, new attributes for existing categories, new sources of data for attributes, etc. Consequently, the taxonomy, the data sources, and the resulting search results, may continuously evolve to increase the likelihood that search engine users are provided, in the search results page itself, the information that they actually want to see.

While a general overview of the functions of the various components of system 100 has been given in this section, a more detail explanations of each of the components shall be given hereafter.

Taxonomy Creation

As mentioned above, a concept hierarchy (taxonomy) is created, and identification of attributes is driven heuristically by search volumes. In one embodiment, taxonomy creation is performed by first creating a seed taxonomy, and then enriching the taxonomy by based on usage information from a search engine.

According to one embodiment, the seed taxonomy includes "editorial" concepts and attributes. Editorial concepts and attributes include (a) categories and attributes selected by editors based on one or more pre-existing data stores, and (b) categories and attributes "manually" established by editors.

The categories and attributes represented in the seed taxonomy may be based on taxonomies used by one or more pre-existing data stores. For example, an existing movie-oriented data store may have information about people already organized into the categories "actors", "directors", and "producers". Within those categories, the data store may have information about specific attributes of individual actors, directors, and producers, respectively. Using this existing taxonomy as a basis for the seed taxonomy, the initial seed taxonomy may include those same categories, and support those same attributes.

With respect to attributes, if it is known that the movie-oriented data store lists the films in which each actor has acted, then "movies acted" may be established as an attribute for the category "movie star", and for the entities, which reside below the "movie star" category within the seed taxonomy, that correspond to individual actors.

An initial seed taxonomy may be created based on numerous pre-existing taxonomies. For example, categories and attributes of the seed taxonomy may include a category for each person listed in multiple existing databases, such as white pages directories and the sources of truth for that particular domain. Thus, the seed taxonomy may be initially established to include a superset of categories and attributes selected from those maintained by existing data stores.

In addition to categories and attributes obtained from existing taxonomies, important attributes can be decided "manually" by editors. The manually decided attributes may include "default" attributes that are associated with all categories of a particular type. For example, editors may decide that all categories that correspond to individual humans will have "date of birth" and "date of death" attributes. Consequently, the entity "Johnny Depp" will have attributes like "date of birth", "date of death" etc. by default.

Learned Catergories and Attributes

According to one embodiment, the feedback mechanism 110 "learns" additional categories and attributes based on usage information obtained from a search engine. For example, to determine the attributes for the "Johnny Depp" entity, the search logs of the search engine are analyzed to determine how users of the search engine have searched on "Johnny Depp". If the search engine reveals that many searches for "Johnny Depp" included the term "quotes", then feedback mechanism 110 suggest the addition of a "quotes" attribute to the "Johnny Depp" entity. Specifically, feedback mechanism 110 may first apply the "quotes" attribute to only the "Johnny Depp" entity. Then later, the "quotes" attribute may be extended to the "Johnny Depp" entity's parent category "movie stars", or grandparent category "humans", if doing so makes sense.

In addition to identifying categories and attributes based on query terms, feedback mechanism 110 may also "learn" attributes based on click-through information obtained from the search engine. For example, in response to being shown the search results for the query "Johnny Depp", users may frequently select links from the search results that lead to movies in which Johnny Depp acted. Based on this usage information, the taxonomy creation subsystem 102 may establish "movies acted" as an attribute of the "Johnny Depp" entity. In addition, system 100 may also make this attribute part of the default display for queries relating to this entity, in case no attribute is mentioned in the query along with the entity. For example. If the search query is simply "Johnny Depp", system 100 may automatically assume that his biography is being asked for, and show the result of "Johnny Depp biography".

Because the attributes for a category are established based on how users have searched for the subject matter associated with category, it is possible for categories of similar types of things to have very different sets of attributes. For example, the "Johnny Depp" entity may have a "movies acted" attribute, while the "George W. Bush" entity does not. On the other hand, the "George W. Bush" entity may have a "political offices" attribute that the Johnny Depp category does not have. This is because the path to the Johnny Depp node will be human→actor→Johnny Depp, whereas the path through the taxonomy to the George W. Bush node would be human→politician→g_w_bush.

The "Ronald Reagan" entity may have both a "movies acted" attribute and a "political offices" attribute. Specifically, in case of Ronald Reagan, there would be an entity which refers to him in both branches of the tree. The system 100 would then try to prioritize politician and actor, and would then be able to disambiguate a user query like "Ronald Reagan political offices" to belong to the politician branch and not the actor branch.

In one embodiment, an attribute is added to a category when the search history indicates that terms associated with the attribute (a) are frequently used along with terms associated with the category, and (b) are predominant across many similar entities.

Learned Aliases

An alias is a term or phrase used within search queries with the intent of obtaining information about a particular category, attribute, or set of attributes. For example, the "date of birth" attribute may have the aliases "birthday", "born", "d.o.b.", etc. As another example, the entity "Johnny Depp" may have the aliases "Johnny D.", "J. Depp", and "Jack Sparrow".

According to one embodiment, in addition to learning categories and attributes from search engine usage data, system 100 also analyzes the usage data to learn aliases associated with categories and attributes. The alias of an attribute or category may be learned from the usage data in a variety of ways.

With respect to learning aliases of attributes, people may be searching for "pictures of Jessica Alba". System 100 may understand who Jessica Alba is (i.e. be able to accurately identify the "Jessica Alba" entity), but not know which attribute refers to "pictures". In this case, the system 100 would realize from query log analysis that "pictures" are needed and that pictures is an alias for photos, an attribute that system 100 already knows.

With respect to learning aliases of entities, based on the usage data, system 100 may determine that "India", "Republic of India", "Hindustan" etc. are all aliases for the entity "India". As another example, search queries relating to the category "Johnny Depp" may frequently include the term "Jack Sparrow".

The frequency with which certain terms appear together may be a factor used to automatically learn aliases. In addition, the usage data may indicate that when users are presented with search results for search queries with certain terms, they frequently select search results that contain certain other terms. For example, the usage data may indicate that when presented with search results for queries that include the term "born", users frequently select links relating to the date of birth. Consequently, the system 100 may establish "born" as an alias to the "date of birth" attribute.

Alias Mapping Information

According to one embodiment, system 100 maintains alias mapping information that indicates the relationships between aliases and their corresponding categories and attributes. Significantly, the mapping of aliases to categories/attributes need not be one-to-one. Specifically, multiple aliases may map to the same category and/or attribute. For example, as explained above, "birthday", "born" and "d.o.b." may all map to the attribute "date of birth".

In addition, multiple categories/attributes may map to a single alias. For example, the alias "family" may be mapped to numerous attributes, including "spouse", "father", "mother", "son" and "daughter". Aliases, such as "family", that are mapped to a collection of related attributes are referred to herein as "collection attributes".

Entity/Attribute Classes

According to one embodiment, attributes are assigned to classes, and aliases such as "when", "where", and "who" are used to map to the classes. Specifically, "when" maps to chronological attributes, "where" maps to geographic attributes, "who" maps to human entities, "what" maps to description attributes, and "how" maps to process attributes. Each of these classes of entities/attributes, in turn, contains multiple entities/attributes. For example, the set of chronological attributes may include "date of birth", "date of death", etc., while geographic attributes include "birthplace", "current residence", etc.

Based on alias-to-attribute-class mappings, system 100 may give appropriate responses to queries such a "When was Ingrid Bergman born?" and "Where was Ingrid Bergman born?" Specifically, in both cases, "born" maps to a variety of attributes, including "date of birth" and "place of birth". However, in the first query, "born" is used in conjunction with "when", which maps to chronological attributes. Because "date of birth" is a chronological attribute and "place of birth" is not, the date of birth data will be provided in response to the "When was Ingrid Bergman born?" query, while the place of birth data will not.

Conversely, because "place of birth" is a geographical attribute, and the second query includes the term "where", the place of birth will be provided in response to the "Where was Ingrid Bergman born?" query, while the date of birth data will not.

Similarly, the terms "who" and "what" indicate the type of entity for which a query is searching. In particular, "who" indicates that the user is searching for entities that represent people. Thus, the results for "Who shot J. R.?" should include a name, rather than time, place, or thing information. On the other hand, "what" indicates that the user is searching for entities that correspond to things, as opposed to people.

Data Mining and Aggreation

After a taxonomy has been created, the taxonomy may be used as a basis for pre-fetching information in which search engine users may be interested. For example, based on the existence of a "movies acted" attribute for the "Johnny Depp" entity, data about the movies in which Johnny Depp has acted may be pre-fetched by the search engine. Having pre-fetched such information, the information may be provided directly to search engine users on the search results page for searches relating to Johnny Depp.

According to one embodiment, data mining subsystem 104 and data aggregation and prioritization subsystem 106 are involved in fetching and processing the actual data that corresponds to the attributes established in the taxonomy. For example, to obtain data for the "date of birth" attribute of human entities, data mining subsystem 102 mines one or more data sources for birth date information.

As illustrated in FIG. 1, such sources may include data sources maintained by the search engine provider (internal data sources), data sources maintained by third parties (external data sources), information obtained from crawled pages, etc.

The process of pre-fetching data involves processing semi-structured data to generate structured data across identified sources of truth for a given domain. Sources of truth are identified, and semi structured information is converted into quickly retrievable structured information using templates based on the existing search specific taxonomy.

In some cases, information for different attributes of the same entity may be available from multiple sources. According to one embodiment, when data aggregation and prioritization subsystem 106 has obtained the same type of information from different sources, subsystem 106 validates that it is in fact the same entity, and then merges the information to form a single point of reference. Example: "Date of birth" of Ingrid Bergman and other semi-structured data from one source is merged with her "date of death" and similar data from another source.

In addition to aggregating attributes from different sources for the same entity, data aggregation and prioritization subsystem 106 may also be configured to derive attributes based on information obtained from one or more sources. For example, the attribute "age" may be derived based on the current date and a date of birth. Consequently, even if no source directly stores the ages of people, data for the "age" attribute may be derived by system 100 based on the date of birth information.

As another example, functions or operations can be applied on attribute values to derive additional attribute values. For example, if a query asks "how many children does XYZ have?", the number of sons and daughters of "XYZ" may be summed to provide the answer directly in the search results page.

Attribute Value Sources

Before data mining subsystem 102 can pre-fetch values for attributes, it must first be know from where to fetch the values. Initially, system 100 does not know all of the data that a source may have. Instead, system 100 initially just knows what attributes users are interested in. Hence, many sources known to system 100 may have more to offer than is currently fetched by data mining subsystem 102. Such addition information from those sources may be fetched at a later point when other attributes become popular.

System 100 may obtain values for attributes from many sources. In fact, attribute values for different attributes of the same entities can be obtained from multiple data sources, depending on availability. According to one embodiment, some of the sources of attribute values can be identified "manually" by editors, while the sources for other attributes values may be "learned" based on the search engine usage data.

For example, editors may be familiar with the types of information maintained by external data sources. Based on this knowledge, the editors may establish a mapping between the fields into which those external data sources are organized, and corresponding categories/attributes within the taxonomy.

On the other hand, the search engine usage information may indicate a strong interest in an attribute for which the editors do not know a source. Under these conditions, the click-through information of the search engine may indicate the sources from which users are obtaining the desired information. Based on the click-through data, the editors may identify one or more sources for the desired attribute information.

According to one embodiment, data sources are given a confidence factor either manually or by means used by regular search engines to merge attribute values of an entity. For example, if two sources provided the same information (e.g. date of birth) for the same entities, system 100 would compare the confidence factors of the various sources and accept the value provided by the source with the higher confidence factor.

Attribute Classification

In one embodiment, data aggregation and prioritization subsystem 106 pre-fetches the data for some attributes, but does not pre-fetch the data for other attributes. The determination of which attributes to pre-fetch may be based on the search engine usage data, and on the nature of the attributes themselves. For example, if the search logs indicate that users frequently search for "date of birth", then data of birth information may be prefetched by system 100. In contrast, the "eye color" information may be searched on so infrequently, that system 100 may decide not to pre-fetch information for the "eye color" attribute.

Even frequently-searched attributes may not be pre-fetched, depending on the nature of the attribute. For example, the values of certain attributes change frequently. For example, "current residence" and "age" change with sufficient frequency that it may not be worthwhile pre-fetching (or pre-deriving) values for these attributes. As another example, information for a "current news" attribute for movie star entities may change on a daily basis. To ensure that search engine users see currently relevant answers to their query "George W. Bush news", system 100 may obtain data for the attribute dynamically, at the time the query is received.

Referring again to FIG. 1, it illustrates an embodiment in which entities and attributes are assigned into three classes: searchable attributes, non-searchable attributes, and dynamic attributes. Attributes whose values change infrequently, but which are searched frequently, will typically be classified as searchable attributes. Thus, date of birth will typically be classified as a searchable attribute. For attributes that are classified as "searchable attributes" data aggregation and prioritization subsystem 106 pre-fetches the data and stores the data in an indexed database.

Attributes whose values change infrequently, but which are searched infrequently, will typically be classified as non-searchable attributes. In the embodiment illustrated in FIG. 1, values for non-searchable attributes are pre-fetched. However, rather being stored in an indexed database, the values for non-searchable attributes are stored in flat files.

Attributes whose values change frequently are classified as dynamic attributes. The values for dynamic attributes are not pre-fetched in the same manner as other attributes. Rather, to ensure freshness of the data for these attributes, the data for the attributes is obtained at the time a search query asks for the data. For example, the data for the "current news" attribute for "Johnny Depp" may be retrieved in response to receiving a query for "Johnny Depp current news". Alternatively, data for dynamic attributes may be "pre-fetched", and then "refreshed" periodically to ensure that the staleness of the information does not exceed a certain threshold.

After data for a dynamic attribute is retrieved (either in response to a query or periodically), the data may be temporarily stored in a dynamic data cache. In one embodiment, the data is stored in the cache with an expiration time. If the data is not accessed in cache for a certain period of time, or if the expiration time has elapsed, then the data is flushed from and/or replaced in the cache. The expiration time for some attributes may be different than for other attributes. For example, "quotes" may have a relatively long expiration time within the cache, while "last sighting" may have a relatively short expiration time.

Entity/Attribute Disambiguation

In one embodiment, to avoid ambiguous results, entities are provided with weights, and categories are assigned priorities. In one embodiment, these weights and priorities are calculated based on the information available, and search weight.

For example, the query "Films of Steven Spielberg" is ambiguous, because the searcher may either be asking for the movies in which Steven Spielberg acted, the movies Steven Spielberg directed, or the movies Steven Spielberg produced. However, the search engine usage data may indicate that users are more frequently interested in information about movies directed by Steven Spielberg. Consequently, for the entity "Steven Spielberg", the "movies directed" attribute will have higher priority than "movies acted". Based on the priority information, system 100 responds to the query "Films of Steven Spielberg" by showing his director credits rather than his actor credits.

The search engine usage data may indicate user preferences in a variety of ways. For example, the search engine usage data may indicate that users have searched for "Steven Spielberg director" more frequently than "Steven Spielberg actor". Similarly, the search engine click-through data may indicate that, after searching for "Steven Spielberg", users more frequently select links associated with his directing credits, rather than his acting credits.

According to one embodiment, attribute prioritization may vary from entity to entity. For example, while "movies directed" may have higher priority than "movies acted" for the entity "Steven Spielberg", "movies acted" may have higher priority than "movies directed" for the entity "Jodie Foster".

Similar to attributes, categories may themselves have priorities established based on search engine usage information. For example, a search for "Howard Johnson" may be asking for information about a person, or information about a hotel chain. If the search engine logs indicate that more searchers are interested in the person "Howard Johnson" than in the hotel chain, then the search engine may favor the person entity over the hotel chain entity. For example, the search engine may provide more results relating to the person entity, or include in the search results data associated with attributes of the person entity.

In addition to search engine usage data, other information may also be used to establish priorities of entities and attributes. For example, if sources available to system 100 include vastly more information about movies directed by "Steven Spielberg" than moves in which "Steven Spielberg" is an actor, then for the entity "Steven Spielberg", the "movies directed" attribute may be given a higher priority than the "movies acted" attribute. With respect to entities, there may be significantly more information about one person named "Charles Williams" than another person with the same name. Under these circumstances, the entity that corresponds to the "Charles Williams" about whom more information is known may be assigned a higher priority than the entity associated with the lesser-known "Charles Williams".

Template Categorization

Query processing subsystem 108 parses queries to identify entities, accesses an inverted index to identify attributes, and then obtains information about the identified attributes of the identified entities. According to one embodiment, the taxonomy is used obtain data about attributes of entities referred to in queries, and the data is used to enhance the content of search results for those queries. However, before the search results to incorporate the values of attributes for entities, it is necessary to identify what entities and attributes the query is asking for.

In one embodiment, system 100 uses templates to identify the entities and attributes for which users are submitting queries. Specifically, when a user queries the system 100, query processing subsystem 108 first tries to classify the query into one of the following templates:

Template 1: Entity is given and value of an attribute is queried for. An example of a query that would match template 1 is: "What is the height of Johnny Depp?"

Template 2: Value of attribute is given and all entities that match the condition are asked for. An example of a query that would match template 2 is: "People born on 16th may"

Template 3: Two entities are given and their relationship is being queried for. An example of a query that would match template 3 is: "How are John Voight and Angelina Jolie related?"

Template 4: Entity and relationship is given and all other entities that fall under that relation are being queried for. An example of a query that would match template 4 is: "Family of Johnny Depp"

Once a query is matched to the template, the template is used to determine which terms within the query correspond to entities and attributes. Once the relevant query terms have been identified, the alias mapping is used to identify the categories and attributes to which those query terms map.

As mentioned above, a single query term and/or phrase (alias) may map to multiple categories, entities and/or multiple attributes. For example, the term "family" may map to the attributes father, mother, spouse, son and daughter. Under these circumstances, the user typically desires information for all of the corresponding attributes.

With respect to entities, the term "Michael Jordan" may map to an entity under the "Sports Star" category (because he's a well known basketball player), and to another entity under the "Movie Star" category (because he had also acted in the movie "Space Jam".

As another example, the term "movies", when used in conjunction with a "Steven Spielberg" entity, may map to both the "movies acted" attribute (associated with the "actors" category) and the "movies directed" attribute (associated with the "directors" category. In this example, the user may only want information from one of the corresponding attributes. However, it is not possible to determine from the query itself which attribute the user desires information about. Under these circumstances, system 100 may decide to include information from both attributes, or use entity-specific priority information to determine which of the attributes is actually desired by the user. For example, the entity-specific priority information may indicate that the "directors" category has a higher priority for "Steven Spielberg" than the "actors" category. Based on this information, system 100 may determine to only display values for the attributes associated with the "directors" category when the entity involved is "Steven Spielberg".

Extraction of Relevant Results Based on the Query Template

Based on the attribute and/or the relationship provided in the query string, the hierarchy in which the entity falls is narrowed, and the corresponding entity/category is picked (as defined in the Template Categorization section). If there are more than one corresponding entities/categories, then the entity/category with the higher priority is picked. The corresponding attribute(s) which is queried for is returned from the system. As explained above, system 100 performs disambiguation of entities and categories based on weights and priorities, respectively, when search queries contain terms that are ambiguous.

In one embodiment, the source from which query processing subsystem 108 obtains the values of attributes depends on how those attributes have been classified. In the embodiment illustrated in FIG. 1, data for searchable attributes are obtained from the indexed database. Data for non-searchable attributes are obtained from flat files. Data for dynamic attributes are obtained from a dynamic data cache. If the dynamic data cache does not contain data for dynamic attributes that are specified in a query, then the data is obtained from other sources, stored in the dynamic data cache, and incorporated into the search results for the query.

Providing Enhanced Search Results

Once query processing subsystem 108 has obtained values for the attribute(s) identified in the query, for the entity identified in the query, the values are passed to display subsystem 112 along with other information that is to be included in the search results. For example, the information passed to query processing subsystem 108 may include a ranked list of websites that satisfy the search criteria, and a special listing that conveys the values for the attributes specified in the query. Thus, the search result page for "family of Johnny Depp" may include a ranked list of documents that includes the search terms "family" "Johnny" and "Depp", but may also include an entry that identifies the father, mother, spouse, siblings and children of Johnny Depp.

Similarly, the search result page for "Johnny Depp quotes" may include a ranked list of documents that include the terms "Johnny", "Depp" and "quotes". However, the search page may also contain an entry that simply lists quotes of Johnny Depp, as such quotes were retrieved by data mining subsystem 104 from an external source.

In one embodiment, the search results information is provided to display subsystem 112 in a particular structure, such as in the form of an XML document. Display subsystem 112 applies a template to the information to format the information as appropriate. The search result page is then provided to the submitter of the search query.

Identifying Currently-Missing Entities, Categories or Attributes

According to one embodiment, query processing (from system logs) results in feedback. Based on the feedback, the feedback mechanism 110 may identify currently-missing entities, categories or attributes.

For example, a query may identify an attribute using a term that has not yet been established as an alias for attribute. For example, the query "how tall is Johnny Depp" uses "how tall" to indicate the "height" attribute. However, "how tall" may not have been established as an alias to the "height" attribute.

As another example, the query "what is the eye color of Johnny Depp" may indicate an attribute ("eye color") that has not previously been established for movie star entities within the taxonomy.

Some of the feedback from the queries can automatically be handled and the missing category, attribute or entity can be added to the system. In one embodiment, the automatic addition of categories, attributes and entities may be performed in a variety of situations.

For example, automatic addition of attributes is performed when (a) the entity is recognized, the attribute is not recognized, but the attribute available in one of the data sources. For example, when "Johnny Depp weight" is queried, Johnny Depp will be present in the system, but the attribute "weight" might be missing. If "weight" information is available in one of the data sources from which the data mining subsystem 104 obtains information about Johnny Depp, then the taxonomy is updated automatically to include a "weight" attribute, and a source of data for the "weight" attribute is located. Once a source is located, data for the weight attributed may be pre-fetched by system 100, so that weight information may be provided directly in the search results pages for queries that ask for weight information.

As another example, automatic addition of attributes is performed when an entity is recognized and the attribute is also recognized, but the value is missing in the system, and is available in one of the data sources. For example, when "Johnny Depp weight" is queried, assume that the entity Johnny Depp is present in the system, and that the attribute "weight" is also available in the system. However, the system may not have any value for the "weight" attribute of the "Johnny Depp" entity. If the weight value is available in an accessible data source, then the weight value is retrieved and updated automatically.

In some situations, the taxonomy is updated based on the feedback by way of manual intervention. For example, manual intervention may be used to obtain information for an attribute of an entity when (a) the entity is recognized, (b) the attribute is recognized, but (c) no data source has the data for the particular attribute of the specified entity. For example, when "Ingrid Bergman weight" is queried, Ingrid Bergman will be present in the taxonomy, "weight" may also be an available attribute. However, it could be that no data source has the weight of Ingrid Bergman. Under these circumstances, manual intervention is used to spot the right data source.

As another example, an entity itself may not be recognized, but data sources may be available for the specified attribute. For example, when "XYZ weight" is queried, if XYZ is not recognized, then manual intervention may be used to add the entity manually using feedback system.

In situations involving a query where neither entity, nor category, nor attributes are recognized, then manual intervention will typically be required to update taxonomy and identify data sources.

Usage Data and Manual Intervention

As mentioned above, manual intervention may be used to update the taxonomy when new categories, entities and/or attributes are encountered within search queries. When such manual intervention is required, it may still be possible to use the search engine usage data to facilitate the update process.

For example, assume that a search engine receives many queries for "Ingrid Bergman weight", and that "weight" is not an attribute for which any known source provides information. Under these circumstances, the "click-through" data of the search engine may indicate which sites were visited by users that submitted the "Ingrid Bergman weight" queries. Those sites have a higher likelihood of containing the desired attribute information, so the taxonomy editors may begin their search for a source of weight information at those sites. Once a source is encountered, the weight data may be retrieved from the source.

If no source is found for an attribute that is frequently searched, the editors themselves may obtain the data for the attribute for multiple entities, store the data in an internal database, and designate the internal database as the source for data for the attribute.

System Features

As explained above, system 100 includes features to that allow a search engine to "give the right answer" when entities or attributes or relationships are involved. For example, while current technologies do not understand the semantics or the grammar of the query 'family of Marilyn Monroe', system 100 is able to identify the entity and attribute to which the query refers, and to provide the desired information directly within the search page results itself.

As another example, system 100 is able to determine that the query 'When was Ingrid Bergman born?' inherently begs for a chronological event, while 'Where was Ingrid Bergman born?' should result in a geographical location. Based on the mapping of these aliases to their respective attributes, system 100 is able to intelligently answer the question.

System 100 is also able to make use of the fact that semi-structured information is available throughout the web. For example, system 100 is able to obtain information to answer the query 'Quotes of Johnny Depp' from one source, while his 'family' (son, daughter, and spouse) information from another source.

In addition, by supporting one-to-many aliases, system 100 is able to determine that 'family of Johnny Depp' would encompass his son(s), daughter(s) and spouse(s) which would themselves be stored as separate attributes. Further, the ability to prioritize attributes on a per-entity basis allows system 100 to present the information that is most likely to be interested to a user, when search terms may otherwise be ambiguous.

As explained above, these features are made possible by creating a category hierarchy (taxonomy), and by identifying attributes heuristically based on search volumes. For example, a seed taxonomy may first be created manually, and then enriched by search volumes received from various verticals. Important attributes can be decided by editors or could be selected based on their search frequency. Consequently, 'Johnny Depp' may have attributes like 'date of birth', 'date of death' etc. by default, but if his search volumes indicate 'quotes' is also searched for and is predominant across many similar entities, then an attribute called as 'quotes' could also be added.

System 100 also processes semi-structured data to generate structured data across identified sources of truth for given domains. Specifically, sources of truth are identified, and semi structured information is converted into quickly retrievable structured information using templates based on the existing search specific taxonomy. Information related to the same entity that has been obtained from different sources, after validating that it is in fact the same To avoid ambiguous results, in one embodiment every entity is provided with weights, and categories have priorities. These weights and priorities are calculated based on the information available, and search weight. For example, "Films of Steven Spielberg" should show his director credits rather than his actor credits. This solves the problem of user engagement by providing related information about the same entity across data sources.

Hardware Overview

Figure 2:
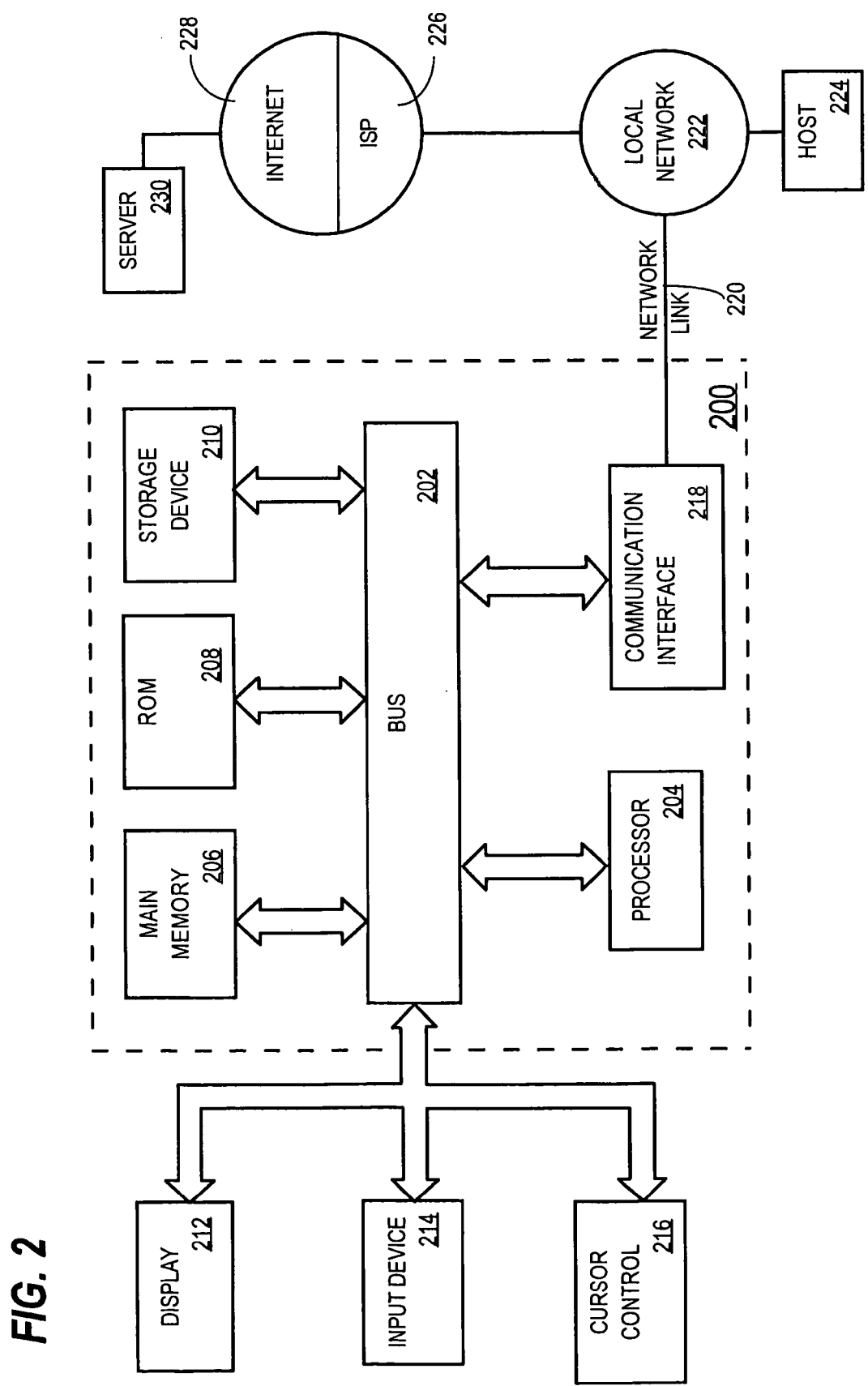
FIG. 2 is a block diagram of a computer system upon which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to storage media and transmission media. Storage media includes both non-volatile media and volatile media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    storing usage information that indicates how users interact with a search engine;
    based on the usage information, updating a taxonomy that includes entities for which users have searched, categories to which the entities belong, and attributes that are associated with the entities;
    assigning a value to a particular attribute that is associated with a particular entity of the entities;
    associating the particular attribute with a category with which the particular entity belongs based on a frequency with which terms associated with the particular attribute occurred based on usage information relating to the particular entity;
    in response to receiving a search query that corresponds to the particular entity, generating search results for the search query that are based, at least in part, on attributes associated with the category to which the particular entity belongs, wherein the attributes include the particular attribute.

2. The method of claim 1 wherein the step of updating the taxonomy includes associating a particular attribute with a category in response to determining that the particular attribute predominates across many entities that belong to the category.

3. The method of claim 1 wherein the step of updating the taxonomy includes adding a particular attribute to the category to which the particular entity belongs based on how frequently users selected hyperlinks associated with the particular attribute when presented search results relating to the particular entity.

4. The method of claim 1 wherein the step of generating search results comprises including, within the search results, an entity-specific value for a particular attribute of the category to which the particular entity belongs.

5. The method of claim 4 further comprising:
    identifying a pre-existing data store that can serve as a source for the particular attribute; and
    pre-fetching the entity-specific value from the pre-existing data store prior to receiving said search query.

6. A non-transitory computer-readable storage medium storing instructions for performing:
    storing usage information that indicates how users interact with a search engine;
    based on the usage information, updating a taxonomy that includes entities for which users have searched, categories to which the entities belong, and attributes that are associated with the entities;
    assigning a value to a particular attribute that is associated with a particular entity of the entities;
    associating the particular attribute with a category with which the particular entity belongs based on a frequency with which terms associated with the particular attribute occurred based on usage information relating to the particular entity;
    in response to receiving a search query that corresponds to the particular entity, generating search results for the search query that are based, at least in part, on attributes associated with the category to which the particular entity belongs, wherein the attributes include the particular attribute.

7. The non-transitory computer-readable storage medium of claim 6, wherein the step of updating the taxonomy includes associating a particular attribute with a category in response to determining that the particular attribute predominates across many entities that belong to the category.

8. The non-transitory computer-readable storage medium of claim 6, wherein the step of updating the taxonomy includes adding a particular attribute to the category to which the particular entity belongs based on how frequently users selected hyperlinks associated with the particular attribute when presented search results relating to the particular entity.

9. The non-transitory computer-readable storage medium of claim 6, wherein the step of generating search results comprises including, within the search results, an entity-specific value for a particular attribute of the category to which the particular entity belongs.

10. The non-transitory computer-readable storage medium of claim 9, wherein the instructions are further for performing:
    identifying a pre-existing data store that can serve as a source for the particular attribute; and
    pre-fetching the entity-specific value from the pre-existing data store prior to receiving said search query.

* * * * *

UNITED STATES PATENT AND TRADEMARK OFFICE
CERTIFICATE OF CORRECTION

PATENT NO. : 8,126,908 B2
APPLICATION NO. : 12/141833
DATED : February 28, 2012
INVENTOR(S) : Sudharsan Vasudevan et al.

It is certified that error appears in the above-identified patent and that said Letters Patent is hereby corrected as shown below:

On the title page item (30) should read

-- (30) Foreign Application Priority Data
INDIA Application 1133/CHE/2008, filed on May 7, 2008 --

Signed and Sealed this
First Day of May, 2012

David J. Kappos
*Director of the United States Patent and Trademark Office*